United States Patent
Wang et al.

(10) Patent No.: US 9,887,436 B2
(45) Date of Patent: Feb. 6, 2018

(54) BATTERY PACK

(71) Applicant: SAMSUNG SDI CO., LTD., Yongin-si, Gyeonggi-do (KR)

(72) Inventors: Han-Jun Wang, Yongin-si (KR); Myeong-Gyu Choi, Yongin-si (KR); Jin-Yong Ha, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 765 days.

(21) Appl. No.: 14/255,346

(22) Filed: Apr. 17, 2014

(65) Prior Publication Data

US 2015/0017506 A1   Jan. 15, 2015

(30) Foreign Application Priority Data

Jul. 9, 2013   (KR) .................. 10-2013-0080324

(51) Int. Cl.
| | |
|---|---|
| *H01M 2/22* | (2006.01) |
| *H01M 10/42* | (2006.01) |
| *H01M 2/10* | (2006.01) |
| *H01M 2/20* | (2006.01) |

(52) U.S. Cl.
CPC ......... *H01M 10/425* (2013.01); *H01M 2/204* (2013.01)

(58) Field of Classification Search
CPC .................................. H01M 10/425
See application file for complete search history.

(56) References Cited

U.S. PATENT DOCUMENTS

| | | |
|---|---|---|
| 2006/0263648 A1 | 11/2006 | Park et al. |
| 2010/0173178 A1 | 7/2010 | Kim et al. |
| 2011/0052941 A1 | 3/2011 | Jang et al. |
| 2011/0151285 A1 | 6/2011 | Hong et al. |
| 2012/0052332 A1 | 3/2012 | Ahn |
| 2012/0231300 A1 | 9/2012 | Park et al. |
| 2012/0276419 A1* | 11/2012 | Park .................... H01M 2/1077 429/7 |

FOREIGN PATENT DOCUMENTS

| | | |
|---|---|---|
| EP | 2 741 347 A1 | 10/2012 |
| KR | 10-0624966 | 9/2006 |
| KR | 10-2007-0101566 A | 10/2007 |
| KR | 10-2010-0081508 | 7/2010 |
| KR | 10-2011-0024251 A | 3/2011 |
| KR | 10-2011-0070030 A | 6/2011 |
| KR | 10-2012-0020907 A | 3/2012 |
| KR | 10-2013-0023033 A | 3/2013 |
| KR | 10-2013-0044821 A | 5/2013 |

OTHER PUBLICATIONS

Korean Office Action dated Jul. 30, 2014.

* cited by examiner

*Primary Examiner* — Ladan Mohaddes
(74) *Attorney, Agent, or Firm* — Lee & Morse, P.C.

(57) ABSTRACT

A battery pack includes unit cells disposed side-by-side, a connection board connecting the unit cells in series and/or in parallel, the connection board including position fixing portions on a first surface, a protection circuit module electrically connected to the connection board, and a first connecting tap and a second connecting tap disposed on the connection board to electrically connect the unit cells and the connection board. At least one of the first connecting tap and the second connecting tap includes one end connected to the unit cells and an other end, the other end including a plurality of bridges at a lower side thereof. The bridges are inserted into the position fixing portions.

16 Claims, 6 Drawing Sheets

BATTERY PACK

CROSS-REFERENCE TO RELATED APPLICATION

Korean Patent Application No. 10-2013-0080324, filed on Jul. 9, 2013, in the Korean Intellectual Property Office, and entitled: "Battery Pack," is incorporated by reference herein in its entirety.

BACKGROUND

1. Field

One or more embodiments relate to battery packs including a plurality of unit cells.

2. Description of the Related Art

Secondary batteries are rechargeable, unlike primary batteries, which are not rechargeable. Secondary batteries are widely used not only in small high-tech electronic devices, such as mobile phones, personal digital assistants (PDAs), and notebook computers, but also in energy storage systems.

Depending on the types of external electronic devices using secondary batteries, the secondary batteries may be used in the form of a single battery or in the form of a plurality of electrically-connected batteries. For example, small devices, such as mobile phones, may operate for a predetermined time with the power and capacity of one battery, while medium or large devices, such as notebook computers, portable digital versatile disks (DVDs), and small personal computers (PCs), may require a plurality of batteries due to their need for high power and large capacity.

SUMMARY

Embodiments are directed to a battery pack, comprising unit cells disposed side-by-side, a connection board connecting the unit cells in series and/or in parallel, the connection board including position fixing portions on a first surface, a protection circuit module electrically connected to the connection board, and a first connecting tap and a second connecting tap disposed on the connection board to electrically connect the unit cells and the connection board. At least one of the first connecting tap and the second connecting tap includes one end connected to the unit cells and an other end, the other end including a plurality of bridges at a lower side thereof, the plurality of bridges being inserted into the position fixing portions.

The position fixing portions may be a plurality of holes or a plurality of grooves.

The connection board may include a circuit pattern configured to connect the unit cells in series and/or in parallel. A portion of the circuit pattern may be exposed through the first surface of the connection board to form a connection pad.

The other end of the at least one of the first connecting tap and the second connecting tap may include a portion attached to the connection pad exposed through the first surface of the connection board.

The other end of the at least one of the first connecting tap and the second connecting tap may include a portion attached to the first surface of the connection board through a lead-containing adhesive material.

The at least one of the first connecting tap and the second connecting tap may includes a connection portion connected to the unit cells, a fixation portion including a first portion attached to the first surface of the connection board and the plurality of bridges extending from the first portion, and a connecting portion connecting the connection portion and the fixation portion.

A connection pad may be located at the first surface of the connection board. The first portion of the fixation portion may be attached to the connection pad.

The position fixing portions may be formed around the connection pad.

The connecting portion may be bent such that the first surface of the connection board faces top surfaces of the unit cells to which the connection portion is attached.

The connecting portion may be located at any one side with respect to an axis passing through centers of the connection portion and the fixation portion, to connect and unite the connection portion and the fixation portion.

Embodiments are also directed to a battery pack including unit cells disposed side-by-side and having a first electrode and a second electrode at a top surface thereof, a connection board electrically connecting the unit cells, the connection board including position fixing portions formed on a first surface, a protection circuit module electrically connected to the connection board, a first connecting tap disposed on the connection board to electrically connect the first electrode and the connection board, and a second connecting tap disposed on the connection board to electrically connect the second electrode and the connection board. The second connecting tap may include a connection portion connected to the second electrode, and a fixation portion attached to the connection board. The fixation portion may include a first portion attached to the first surface of the connection board, and a plurality of bridges extending downward from the first portion and inserted into the position fixing portions.

The position fixing portions may be a plurality of holes or a plurality of grooves.

The connection board may include a pattern configured to connect the unit cells in series and/or in parallel. A portion of the pattern may be exposed through the first surface of the connection board to form a connection pad.

The position fixing portions may be located around the connection pad.

The first portion of the fixation portion may be attached to the connection pad.

A lead-containing adhesive material may be interposed between the first portion and the connection pad.

The second connecting tap may further include a connecting portion connecting the connection portion and the fixation portion. The connecting portion may be bent such that the connection board is located on the unit cells.

The connecting portion may be bent such that the first surface of the connection board faces top surfaces of the unit cells.

The position fixing portions may correspond to a position and shape of the plurality of bridges.

The protection circuit module may be bent perpendicularly to the connection board such that the protection circuit module is adjacent to side surfaces of the unit cells.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Although terms such as "first" and "second" may be used herein to describe various elements or components, these elements or components should not be limited by these terms. These terms are only used to distinguish one element or component from another element or component. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Figure 1:
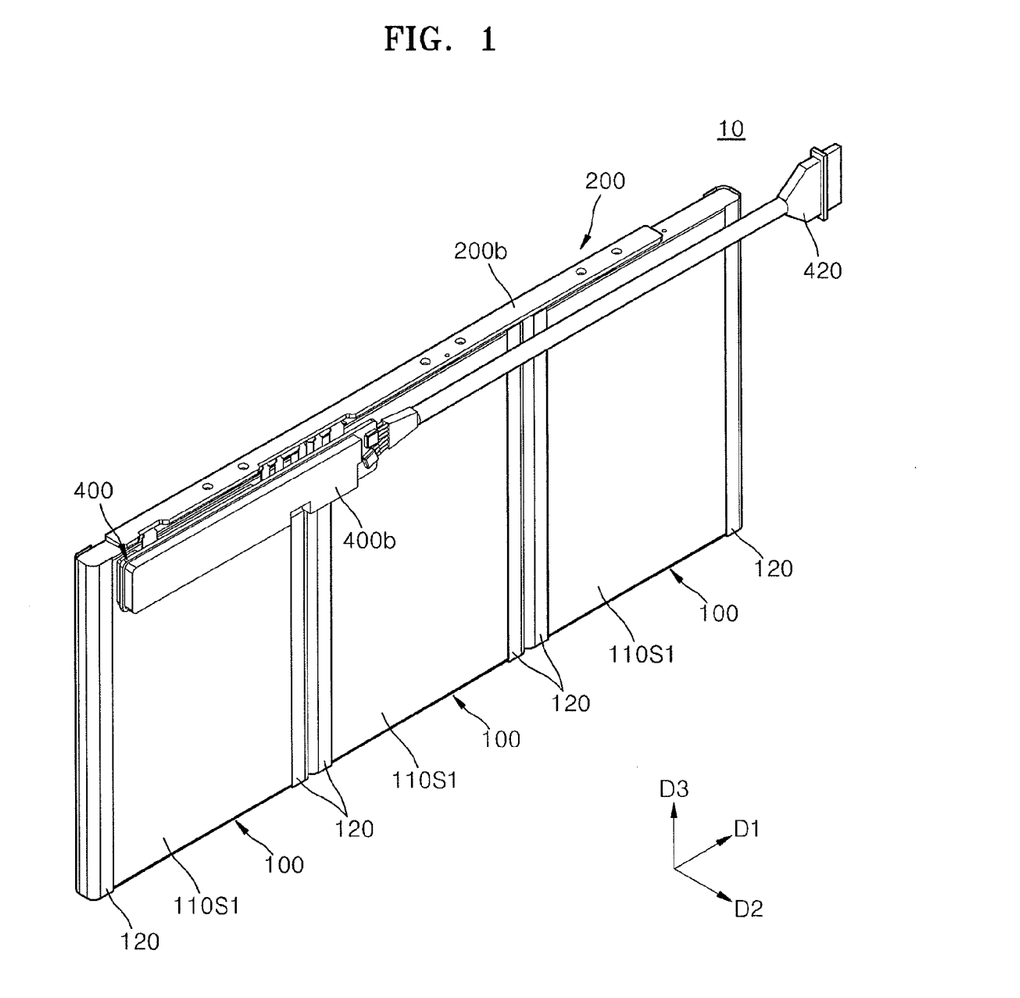
FIG. 1 illustrates a schematic perspective view of a battery pack according to an embodiment.
Figure 2:
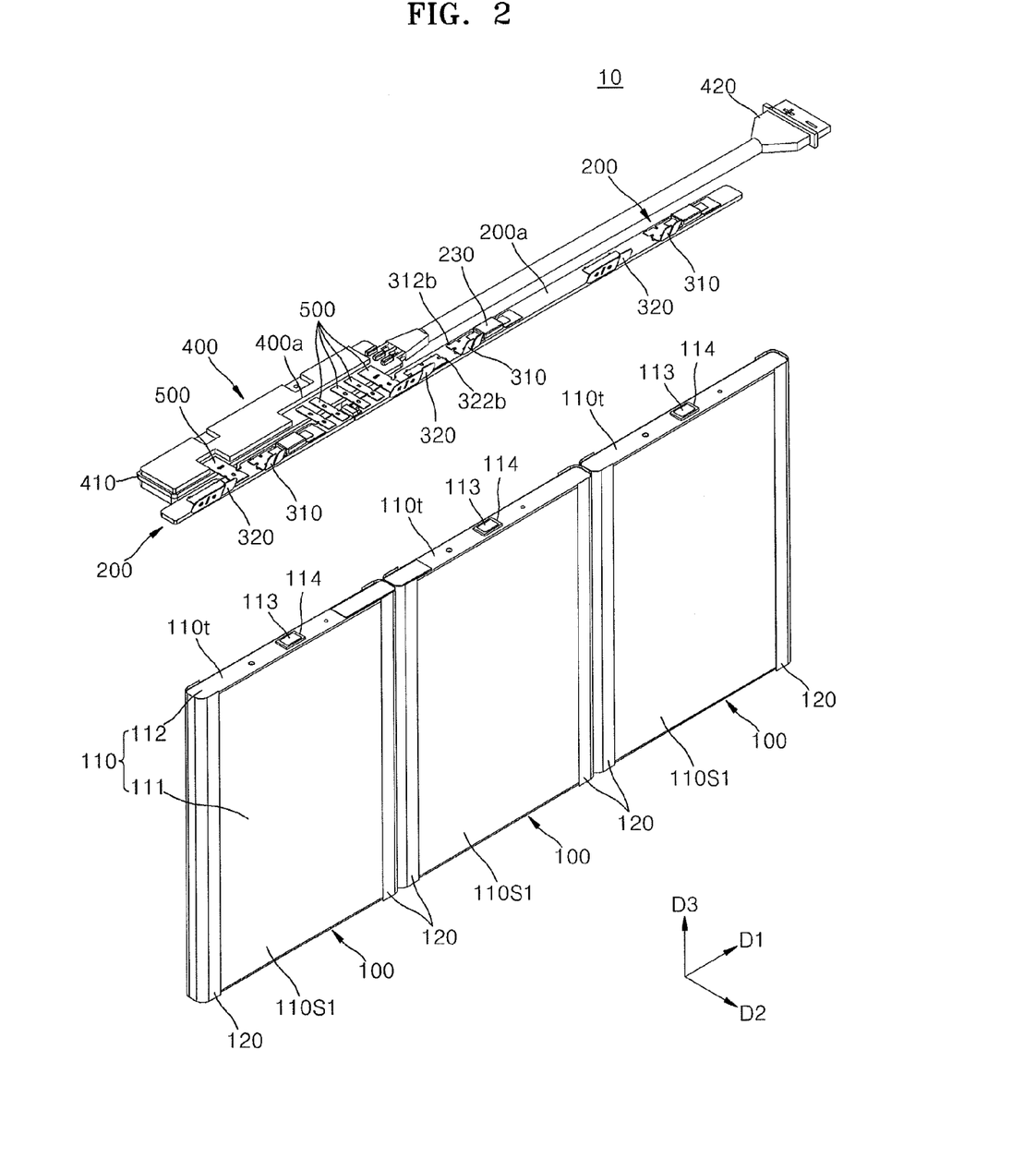
FIG. 2 illustrates an exploded perspective view of the battery pack of FIG. 1.
Figure 3:
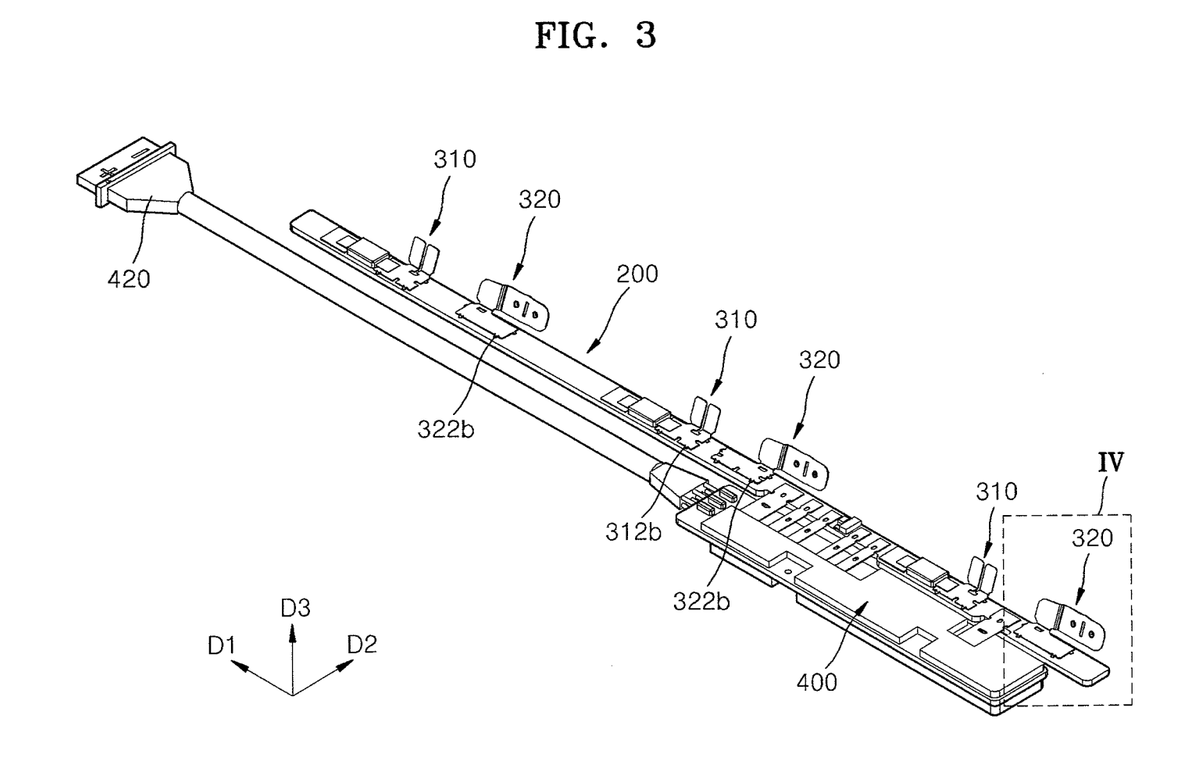
FIG. 3 illustrates a perspective view of a connection board and a protection circuit module of FIG. 2, as viewed from a different direction from FIG. 2.

FIG. 1 illustrates a schematic perspective view of a battery pack 10 according to an embodiment. FIG. 2 illustrates an exploded perspective view of the battery pack 10 of FIG. 1. FIG. 3 illustrates a perspective view of a connection board 200 and a protection circuit module 400 of FIG. 2, as viewed from a different direction from FIG. 2.

Referring to FIGS. 1 through 3, the battery pack 10 may include a plurality of unit cells 100, a connection board 200 electrically connecting the unit cells 100, a first connecting tap 310, a second connecting tap 320, a protection circuit module 400, and a lead 500.

The unit cell 100 may be a lithium-ion cell as a secondary cell that is rechargeable. The unit cell 100 may include an electrode assembly and a can 110 accommodating the electrode assembly and an electrolyte.

The electrode assembly may be formed by stacking a positive electrode plate, a negative electrode plate, and a separator interposed therebetween, and winding the same in the shape of a jelly roll. The electrode assembly may be accommodated in the can 110. To this end, the can 110 may include a body 111 with an opened top surface, and a cap plate 112 closing the opened top surface of the body 111. The electrode assembly may be accommodated in the body 111, and an opening formed in the body 111 after the accommodation of the electrode assembly in the body 111 may be closed by the cap plate 112. The cap plate 112 may be joined to the body 111 by welding, and the electrolyte may be injected through a separate inlet provided after the cap plate 112 is welded to the body 111.

The unit cell 100 may have the shape of a rectangular parallelepiped having a top surface, a bottom surface, first and second side surfaces that extend from the long sides of the top surface and the bottom surface in parallel to each other, and third and fourth side surfaces that extend from the short sides of the top surface and the bottom surface in parallel to each other.

The unit cells 100 may be disposed side-by-side in one direction. For example, the unit cells 100 may be disposed side-by-side such that the third surface of any one of the unit cells 100 faces the fourth surface of the neighboring unit cell 100.

The can 110 of the unit cell 100 may be formed of a metallic material in order to maintain rigidity in the event that the unit cell 100 is dropped. For example, the can 110 may be formed of aluminum or an aluminum alloy. When the can 110 contains a metallic material, since the unit cells 100 disposed side-by-side may cause a short circuit through the side surfaces thereof, the facing surfaces of the unit cells 100 may be electrically insulated. For example, the third surface and the fourth surface of the neighboring unit cells 100 may be covered with an insulating sheet 120, such as an insulating tape.

A first electrode (hereinafter, referred to as "negative electrode") and a second electrode (hereinafter, referred to as "positive electrode") of the unit cell 100 may be formed on the top surface of the unit cell 100, for example, on the cap plate 112. The negative electrode plate of the electrode assembly may be electrically connected to an electrode terminal 113 on the cap plate 112, and the positive electrode plate of the electrode assembly may be electrically connected to the cap plate 112, so that the electrode terminal 113 may form the negative electrode of the unit cell 100, and the cap plate 112 may form the positive electrode of the unit cell 100. In this case, if the cap plate 112 contains a metallic material, such as aluminum or aluminum alloy, like the body 111, a gasket 114 may be interposed between the electrode terminal 113 and the cap plate 112 in order to prevent a short circuit between the electrode terminal 113 (negative electrode) and the cap plate 112 (positive electrode).

The connection board 200 electrically connects the unit cells 100. For example, the connection board 200 may connect the unit cells 100 in series, in parallel, or in series-parallel. The connection board 200 may be a printed circuit board (PCB) on which a circuit pattern for electrically connecting the unit cells 100 is printed.

The first connecting tap 310 and the second connecting tap 320 may electrically connect the connection board 200 and the unit cell 100. One end of the first/second connecting tap 310/320 may be connected to the unit cell 100, and the other end of the first/second connecting tap 310/320 may be attached to the connection board 200. For example, one end of the first connecting tap 310 may be connected to the electrode terminal 113 (the negative electrode of the unit cell 100) and the other end thereof may be attached to the connection board 200. Similarly, one end of the second connecting tap 320 may be connected to the cap plate 112 (the positive electrode of the unit cell 100) and the other end thereof may be attached to the connection board 200.

The unit cells 100, connected electrically to the connection board 200 by the first and second connecting taps 310 and 320, may be connected in series, in parallel, or in series-parallel by the circuit pattern formed on the connection board 200.

A board on which a circuit pattern for electrically connecting the unit cells 100 may be used as the connection board. Accordingly, it may not be necessary to provide a separate metallic plate for connecting the unit cells 100 in series/parallel. Therefore, use of a wire connection between metallic plates may be avoided, and the unit cells 100 may be electrically connected easily just by the junction between the first/second connecting tap 310/320 and the connection board 200 and the junction between the first/second connecting tap 310/320 and the positive/negative electrode of the unit cell 100. Also, the connection board 200 may be rigid. Accordingly, a risk that a disposition state of the connection board 200 disposed in parallel to top surfaces 110t of the unit cells 100 will be disordered, or the connection board 200 and the top surfaces 110t of the unit cells 100 will be short-circuited may be minimized.

The protection circuit module 400 may be electrically connected to the connection board 200. The protection circuit module 400 may be electrically connected to the unit cells 100 through the connection board 200, and may prevent overheating and explosion that could be caused by over-charge, over-discharge, or over-current of the unit cells 100.

The protection circuit module 400 may include a board 410 and a protection element (not illustrated) that is installed at one side or an inside of the board 410. The protection element may selectively include safety elements, including passive elements, such as resistors and capacitors, or active elements, such as field-effect transistors, or integrated circuits. A connector 420 for supplying power to an external electronic device may be provided at one side of the protection circuit module 400.

The protection circuit module 400 may be electrically connected to the connection board 200 by the lead 500. One end of the lead 500 may be connected to the protection circuit module 400, and the other end of the lead 500 may be connected to the connection board 200.

The protection circuit module 400 and the connection board 200 illustrated in FIG. 2 may be bent as illustrated in FIG. 1. The protection circuit module 400 and the connection board 200 may be disposed to be adjacent to side surfaces 110s1 and the top surfaces 110t of the unit cells 100. Accordingly, the occupation space of the protection circuit module 400 and the connection board 200 in the battery pack 10 may be minimized, and thus, a compact battery pack 10 may be manufactured.

For example, the lead 500 disposed on a first surface 400a of the protection circuit module 400 and a first surface 200a of the connection board 200 may be bent such that the protection circuit module 400 is disposed in parallel to side surfaces of the unit cells 100, for example, the first side surfaces 110s1.

The first and second connecting taps 310 and 320 may be bent such that the connection board 200 is disposed to be parallel to the top surfaces 110t of the unit cells 100. For example, when the first and second connecting taps 310 and 320 are bent, the connection board 200 may be oriented such that the first surface 200a of the connection board 200 faces the top surfaces 110t of the unit cells 100.

The first connecting tap 310 may include a temperature cutoff (TCO) 230. An end of the first connecting tap 310 disposed on the connection board 200 may be divided into two portions, and the TCO 230 may be interposed between the two portions.

The TCO 230 may be an element for blocking a current flow when the unit cell 100 is overheated to a predetermined temperature or more, thereby preventing the ignition or explosion of the unit cell 100. For example, when the unit cell 100 is overheated or over-charged/discharged, the TCO 230 may block a current flow.

The TCO 230 may be an element that is reversible between conduction and insulation according to temperatures. For example, the TCO 230 may include a polymer that is formed by dispersing conductive particles, such as metal particles or carbon particles, in a crystalline polymer, a positive temperature coefficient (PTC), a fuse, a current blocking element, or a bimetal.

The first and second connecting taps 310 and 320 may be disposed on and connected to the connection board 200 by a lead-containing adhesive material. In this case, one end of the first/second connecting tap 310/320 may be connected to the negative/positive electrode of the unit cell 100, and the other end of the first/second connecting tap 310/320 may be attached on the connection board 200. However, since one end of the first/second connecting tap 310/320 is bent, the center of gravity of the first/second connecting tap 310/320 may be shifted to the one end of the first/second connecting tap 310/320. When the center of gravity of the first/second connecting tap 310/320 is shifted to the one end connected to the unit cell 100, the position of the first/second connecting tap 310/320 on the connection board 200 may deviate, and the first/second connecting tap 310/320 may not adhere well to the connection board 200. For example, if the second connecting tap 320 were to be fixed on the connection board 200 by coating the top surface of the connection board 200 with an adhesive material, disposing the second connecting tap 320, and heating the resulting structure by ultraviolet rays when the center of gravity of the second connecting tap 320 is shifted to one end connected to the cap plate 112, the second connecting tap 320 may become misaligned on the connection board 200.

However, according to an embodiment, a bridge 322b may be formed to extend downward from the other end of the second connecting tap 320, which is fixed to the connection board 200. Accordingly, misalignment of the second connecting tap 320 may be prevented. In addition, a bridge 312b may be disposed at a lower side of the end of the first connecting tap 310 that is fixed to the connection board 200 to prevent misalignment of the first connecting tap 310. However, for the convenience of description, the second connecting tap 320 will be described below as an example, and it is to be understood that such description may also be applicable to the first connecting tap 310.

Figure 4:
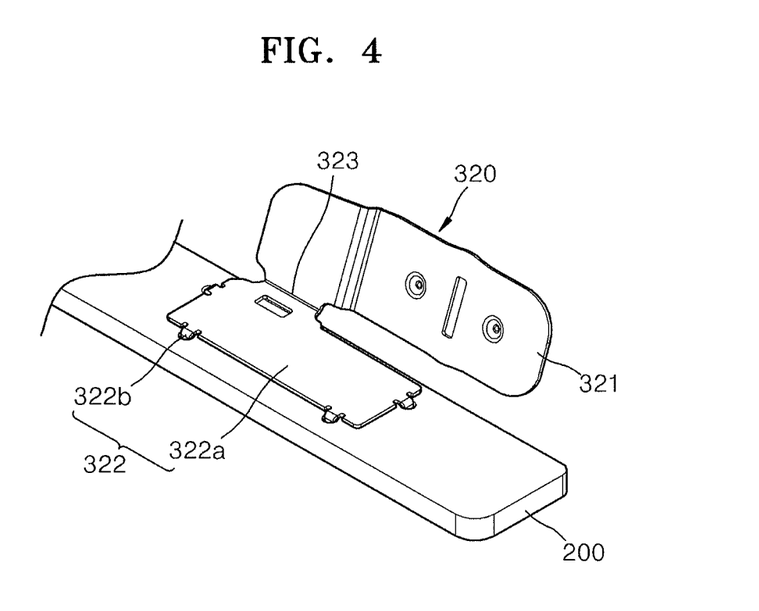
FIG. 4 illustrates an enlarged perspective view of a portion IV of FIG. 3.
Figure 5:
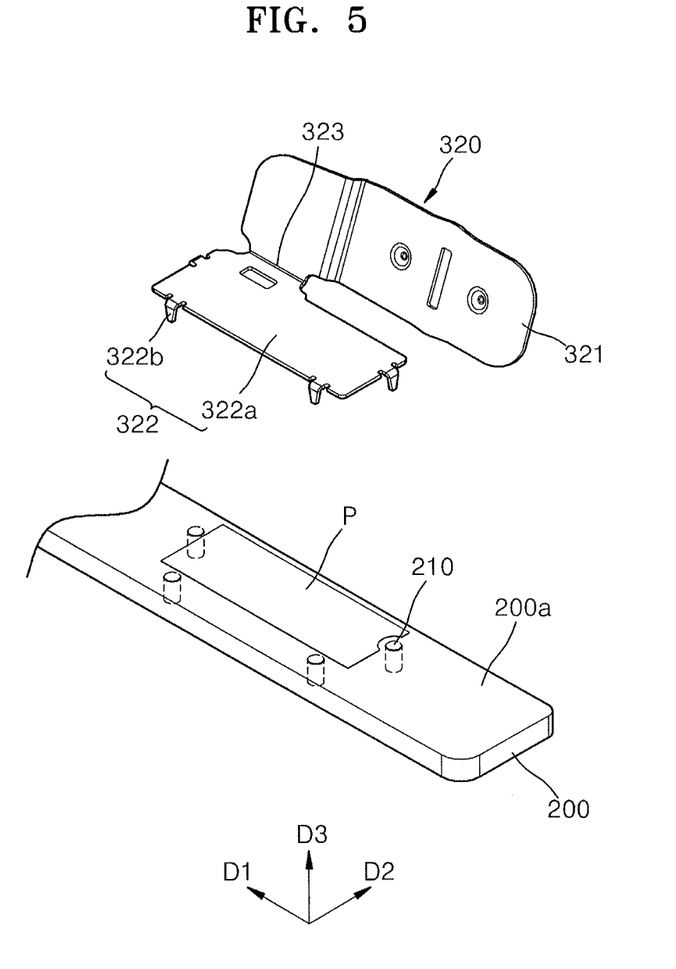
FIG. 5 illustrates an exploded perspective view of FIG. 4.

FIG. 4 illustrates an enlarged perspective view of a portion IV of FIG. 3. FIG. 5 illustrates an exploded perspective view of FIG. 4.

Referring to FIGS. 4 and 5, the second connecting tap 320 may include a connection portion 321 formed at one end thereof, a fixation portion 322 formed at the other end thereof, and a connecting portion 323 connecting the connection portion 321 and the fixation portion 322.

The connection portion 321 may be connected to the unit cell 100, for example, the cap plate 112 (the positive electrode of the unit cell 100), the fixation portion 322 may be attached to the connection board 200, and the connecting portion 323 may connect and unite the connection portion 321 and the fixation portion 322. The connecting portion 323 may connect the connection portion 321 and the fixation portion 322 by being located at any one of the two sides with respect to an axis passing through the centers of the connection portion 321 and the fixation portion 322. For example, the connecting portion 323 may connect one side of the connection portion 321 and one side of the fixation portion 322. In other implementations, the connecting portion 323 may be formed at any suitable portion as long as the connecting portion 323 connects the connection portion 321 and the fixation portion 322.

The connection portion 321 may be connected to the unit cell 100, the fixation portion 322 may be attached to the connection board 200, and then the connecting portion 323 may be bent. Accordingly, as illustrated in FIG. 1, the first surface 200a of the connection board 200 may be disposed to face the top surfaces 110t of the unit cells 100. When the connecting portion 323 is bent, the connection portion 321 and a first portion 322a of the fixation portion 322 may be disposed in parallel while facing each other.

The fixation portion 322 may include the first portion 322a and a plurality of bridges 322b extending downward from the first portion 322a. The first portion 322a may be attached to the first surface 200a of the connection board 200, and the bridges 322b may be fixed into position fixing portions. The position fixing portions may be, for example, a plurality of holes 210 formed in the first surface 200a of the connection board 200. The holes 210 may be formed in the first surface 200a of the connection board 200 to correspond the positions and shapes of the bridges 322b. The fixation portion 322 of the second connecting tap 320 may include the first portion 322a and the bridges 322b formed at the lower side of the first portion 322a. The first portion 322a may be attached to the first surface 200a of the connection board 200, and the bridges 322b may be inserted and fixed into the holes 210 of the connection board 200. The second connecting tap 320 may be stably attached to the connection board 200, and a position deviation or misalignment of the second connecting tap 320 on the connection board 200 may be minimized or prevented. The bridges 322b may be fixed into the holes 210 by a lead-containing adhesive material. However, in other implementations, any suitable method may be used as long as the bridges 322b are fixed into the holes 210.

The first surface 200a of the connection board 200 may be provided with the holes 210 into which the bridges 322b of the second connecting tap 320 are inserted, respectively, to stably fix the second connecting tap 320 to the connection board 200, and a connection pad P that is connected to the first portion 322a of the second connecting tap 320. As described above, the connection board 200 may be a printed circuit board including a circuit pattern for connecting the unit cells 100 in series, in parallel, or in series-parallel. In this case, a portion of the circuit pattern may be exposed through the first surface 200a of the connection board 200 to form the connection pad P. Around the connection pad P, the holes 210 corresponding to the bridges 322b may be formed in the first surface 200a of the connection board 200.

The bridges 322b extending downward from the first portion 322a of the fixation portion 322 have been described above. In other implementations, one or more bridges 322b may be formed at any suitable location other than the lower side of the first portion 322a.

Figure 6:
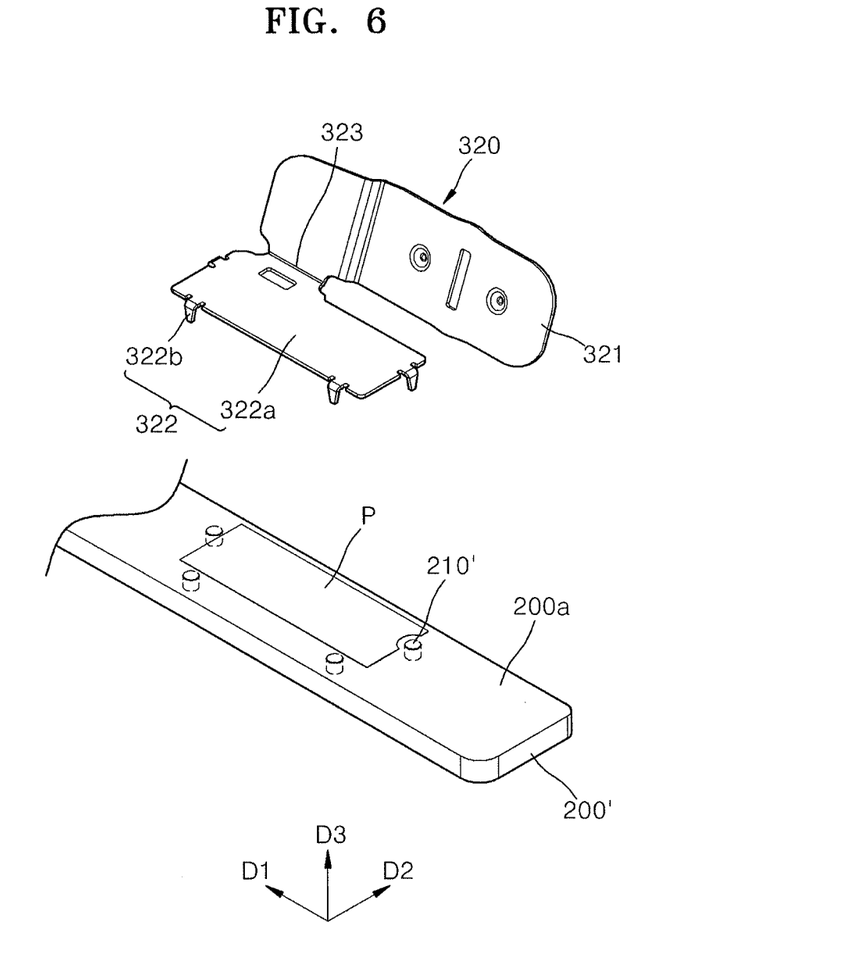
FIG. 6 illustrates a schematic exploded perspective view of a connection board and a second connecting tap according to another embodiment.

FIG. 6 illustrates a schematic exploded perspective view of a connection board 200' and a second connecting tap 320 according to another embodiment. In FIG. 6, with respect to the connection board 200 and the second connecting tap 320 of FIG. 5, like reference numerals denote like elements, and a description of like elements will not be repeated.

Referring to FIG. 6, as described above, the second connecting tap 320 may include a connection portion 321 formed at one end thereof, a fixation portion 322 formed at the other end thereof, and a connecting portion 323 connecting the connection portion 321 and the fixation portion 322. The connection portion 321 may be connected to the cap plate 112 (the positive electrode of the unit cell 100). The fixation portion 322 may be attached on the connection board 200. The connecting portion 323 may connect and unite one side of the connection portion 321 and one side of the fixation portion 322.

Also, the connection portion 321 may be connected to the unit cell 100, the fixation portion 322 may be attached to the connection board 200, and then the connecting portion 323 may be bent. Accordingly, as illustrated in FIG. 1, the first surface 200a of the connection board 200 may be disposed to face the top surfaces 110t of the unit cells 100. The connecting portion 323 may be bent such that the connection portion 321 and a first portion 322a of the fixation portion 322 are disposed in parallel while facing each other.

The connection board 200' according to the this embodiment may include a connection pad P formed at the first surface 200a, and a plurality of position fixing portions, such as, for example, a plurality of grooves 210', formed around the connection pad P to correspond to a plurality of bridges 322b of the second connecting tap 320.

Unlike in FIG. 5, in FIG. 6, a plurality of grooves 210', instead of holes 210, may be formed to fix the bridges 322b of the second connecting tap 320.

The second connecting tap 320 may be disposed and connected to the first surface of 200a of the connection board 200 by a lead-containing adhesive material, and the bridges 322b included in the second connecting tap 320 may be disposed in the grooves 210' of the first surface 200a. The second connecting tap 320 may be stably attached to the connection board 200, and the position deviation or the misalignment of the second connecting tap 320 on the connection board 1 may be minimized or prevented.

The second connecting tap 320 has been described above with reference to FIGS. 4 through 6. The other end of the first connecting tap 310 may also include a plurality of bridges, like the second connecting tap 320, and may be stably attached to the first surface 200a of the connection board 200.

By way of summation and review, medium or large electronic devices may use a battery pack in which a protection circuit is connected to a plurality of batteries that are connected in series or in parallel. In order to manufacture a battery pack having a sufficient power and capacity, it is desirable to establish a stable electrical connection between batteries.

Embodiments provide battery packs including a plurality of unit cells and having a stable electrical connection between members.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
   unit cells disposed side-by-side;
   a connection board connecting the unit cells in series and/or in parallel, the connection board including position fixing portions on a first surface;
   a protection circuit module electrically connected to the connection board; and
   a first connecting tap and a second connecting tap disposed on the connection board to electrically connect the unit cells and the connection board,
   wherein at least one of the first connecting tap and the second connecting tap includes a connection portion connected to the unit cells and a fixation portion, the fixation portion including a plurality of bridges at a lower side thereof, the plurality of bridges being inserted into the position fixing portions, and a connecting portion connecting the connection portion and the fixation portion, wherein the connecting portion is bent such that the first surface of the connection board faces top surfaces of the unit cells to which the connection portion is attached.

2. The battery pack as claimed in claim 1, wherein the position fixing portions are a plurality of holes or a plurality of grooves.

3. The battery pack as claimed in claim 1, wherein:
   the connection board includes a circuit pattern configured to connect the unit cells in series and/or in parallel, and
   a portion of the circuit pattern is exposed through the first surface of the connection board to form a connection pad.

4. The battery pack as claimed in claim 3, wherein the other end of the at least one of the first connecting tap and the second connecting tap includes a portion attached to the connection pad exposed through the first surface of the connection board.

5. The battery pack as claimed in claim 1, wherein the other end of the at least one of the first connecting tap and the second connecting tap includes a portion attached to the first surface of the connection board through a lead-containing adhesive material.

6. The battery pack as claimed in claim 1, wherein:
   a connection pad is located at the first surface of the connection board, and
   the lower side of the fixation portion is attached to the connection pad.

7. The battery pack as claimed in claim 6, wherein the position fixing portions are formed around the connection pad.

8. The battery pack as claimed in claim 1, wherein the connecting portion is located at any one side with respect to an axis passing through centers of the connection portion and the fixation portion, to connect and unite the connection portion and the fixation portion.

9. A battery pack, comprising:
   unit cells disposed side-by-side and having a first electrode and a second electrode at a top surface thereof;
   a connection board electrically connecting the unit cells, the connection board including position fixing portions formed on a first surface;
   a protection circuit module electrically connected to the connection board;
   a first connecting tap disposed on the connection board to electrically connect the first electrode and the connection board; and
   a second connecting tap disposed on the connection board to electrically connect the second electrode and the connection board,
   wherein:
   the second connecting tap includes a connection portion connected to the second electrode, a fixation portion attached to the connection board, the fixation portion including a first portion attached to the first surface of the connection board, and a plurality of bridges extending downward from the first portion and inserted into the position fixing portions, and a connecting portion connecting the connection portion and the fixation portion, the connecting portion being bent such that the connection board is located on the unit cells and first surface of the connection board faces top surfaces of the unit cells.

10. The battery pack as claimed in claim 9, wherein the position fixing portions are a plurality of holes or a plurality of grooves.

11. The battery pack as claimed in claim 9, wherein:
    the connection board includes a pattern configured to connect the unit cells in series and/or in parallel, and
    a portion of the pattern is exposed through the first surface of the connection board to form a connection pad.

12. The battery pack as claimed in claim 11, wherein the position fixing portions are located around the connection pad.

13. The battery pack as claimed in claim 11, wherein the first portion of the fixation portion is attached to the connection pad.

14. The battery pack as claimed in claim 13, wherein a lead-containing adhesive material is interposed between the first portion and the connection pad.

15. The battery pack as claimed in claim 9, wherein the position fixing portions correspond to a position and shape of the plurality of bridges.

16. The battery pack as claimed in claim 9, wherein the protection circuit module is bent perpendicularly to the connection board such that the protection circuit module is adjacent to side surfaces of the unit cells.

* * * * *